Jan. 24, 1967  J. N. ZEMEL ET AL  3,300,644
SELF-CHOPPING PHOTODETECTOR
Filed Dec. 4, 1963

W=ENERGY IN NUMBER OF PHOTONS RECEIVED
FROM ELECTROMAGNETIC RADIATION

INVENTORS.
JAY N. ZEMEL
DONALD E. BODE

R.F. Horsfield

BY

ATTORNEY

United States Patent Office 3,300,644
Patented Jan. 24, 1967

3,300,644
SELF-CHOPPING PHOTODETECTOR
Jay N. Zemel, 1010 Robroy Drive, Silver Spring, Md. 20903, and Donald E. Bode, 3617 Foothill Road, Santa Barbara, Calif. 93105
Filed Dec. 4, 1963, Ser. No. 327,944
10 Claims. (Cl. 250—211)

The invention described herein may be manufactured and used by or for the Government of the United States of America for governmental purposes without the payment of any royalties thereon or therefor.

The present invention relates generally to radiation detectors and more specifically to a method and means for modulating those photodetective devices, the responses of which are limited by the surface recombination rate thereof. This invention enables the rapid sampling of infrared, visible and ultraviolet radiation.

The prior art devices for sampling radiation which are currently available are mechanical radiation choppers, for example, those of the rotating shutter type. These mechanical systems are limited in speed and require relatively large amounts of power to operate. The maximum bandwidth for receiving information has been achieved by chopping the radiation at the limiting frequency of the detector. The weight of the mechanical chopper and the energy source used therewith is frequently many times greater than the weight of the detector, and in military hardware this can be a serious problem.

The present invention embraces all of the advantages of the moving shutter type mechanical radiation chopper while at the same time provides a device which is light in weight, requires a minimum power consumption for normal operation and which eliminates the rotating shutter as an essential element of the device and heretofore necessary in mechanical radiation choppers.

An object of the present invention is the provision of means for rapidly sampling visible, infrared and ultraviolet radiation by making use of the intrinsic properties of a semiconductor.

Another object is to provide a method of modulating those photodetective devices, the responses of which are limited by the surface recombination rate of the photodetector used.

A further object of the invention is to provide a photodetector which is extremely light in weight and which requires the minimum amount of power to operate.

A still further object of the invention is to obviate the problems heretofore encountered in the moving shutter type electromagnetic radiation chopper.

The present invention comprises a capacitor means, having semiconductor plates, exposed to electromagnetic radiation to be detected. The surface charge carrier recombination velocity in the semiconductor is varied by applying an electric field across the plates of the above capacitor means to vary the surface potential of the semiconductor. A photoconductive signal may be extracted from the semiconductor, with said signal being modulated in accordance with the variation in the surface recombination velocity rate. So long as the photoconductor response is limited by the surface recombination rate of the hole-electron pairs, an applied electric field normal to the surface will cause the sensitivity of the photoconductor to vary.

The exact nature of this invention as well as other objects and advantages thereof will be readily apparent to one skilled in the art from a consideration of the following description relating to the annexed drawing in which.

Figure 1:
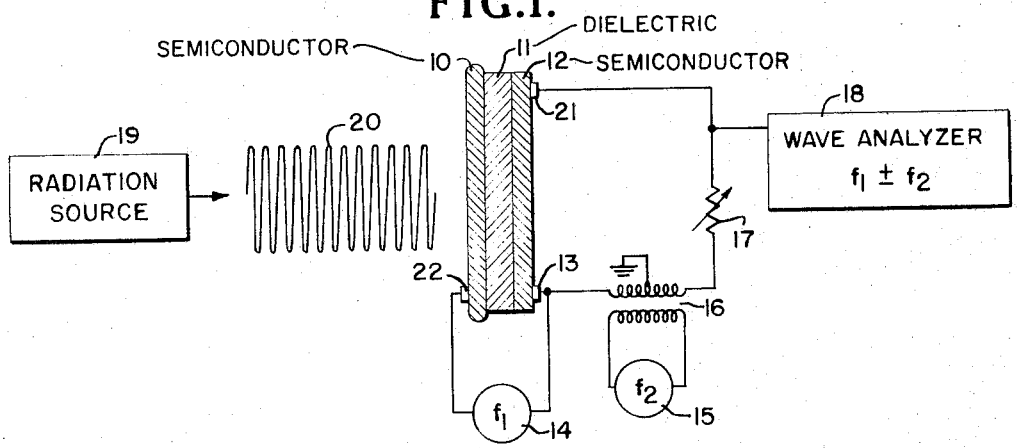
FIG. 1 illustrates a typical semiconductor structure and electrical circuitry therefor which is employed to carry out the novel method of this invention.

The embodiment of FIG. 1 comprises a pair of semiconductor slabs 10 and 12 which are separated by a dielectric material 11 to form the first and second plates of a capacitor. A first source 14 of alternating voltage of frequency $f_1$ is connected across the semiconductor slabs at electrodes 22 and 13. An output circuit is connected to electrodes 13 and 21 and includes a variable resistor 17 and the secondary winding of transformer 16. A second source 15 of alternating voltage at frequency $f_2$ is coupled to the primary winding of transformer 16 and a wave analyzer 18 is provided at output connection 22.

It should be clearly noted that the present invention involves a method of detecting and sampling electromagnetic radiation, and is by no means limited to the specific typical structure set forth in FIG. 1 to carry out this novel method. For example, slab 10 could be made of a transparent material and the dielectric material 11 varied so long as the surface potential of slab 12 is properly controlled by source 14. Slab 10 may be composed of any material which is transparent for a given bandwidth of radiation to be detected, and the dielectric material 11 may be composed of any material capable of withstanding voltages applied at source 14 necessary to modulate the surface recombination rate of slab 12.

Operation

Upon reception of electromagnetic radiation at the surface of semicodnuctor 10, assuming for the moment that the source 14 is disconnected, there will be an additional current flow in the output circuit due to the photoconductivity effect present when the radiation photons received by semiconductor 12 excite charge carriers in the semiconductor. In the absence of source 14, current flowing in the output circuit of the device would be dependent upon the voltage at source 15, the intensity of the incoming radiation, and the wave length of the incoming radiation. By applying a source of alternating voltage 14 between the electrodes 13 and 22 of the semiconductor slabs, an alternating electric field will penetrate the surface of semiconductor slab 12. The photoconductive sensitivity of the semiconductor slab 12 will be modulated in accordance with the surface recombination velocity of the photo induced charge carriers at the surface of the slab 12. The photoconductive signal current is a function of the intensity of the incoming radiation and the surface recombination velocity of the photo induced charge carriers at the surface of semiconductor 12. Since the surface recombination velocity of the carriers is a function of the surface potential of the semiconductor 12, this recombination velocity will be modulated by the external field of the source 14.

Figure 2A:
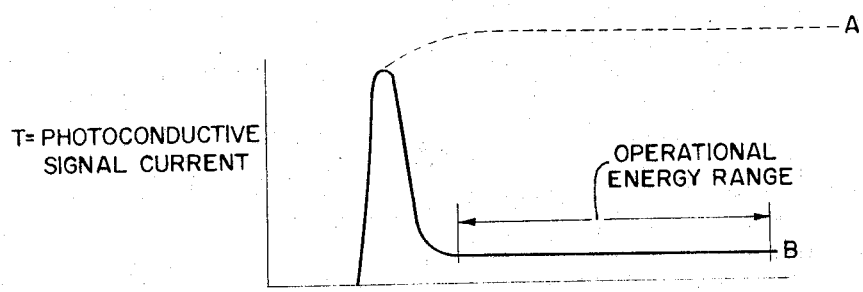
FIG. 2a is a graph of photoconductive signal current in the output semiconductor slab 12 of FIG. 1 plotted as a function of incoming photon energy.
Figure 2B:
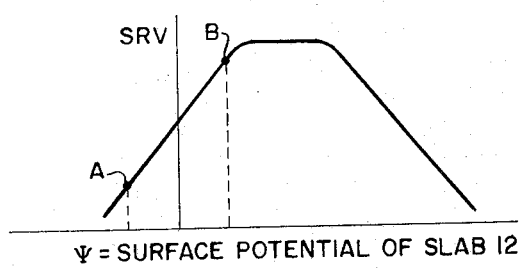
FIG. 2b is a plot of the surface recombination velocity as a function of surface potential of slab 12.

FIG. 2a is a representation of the photoconductive signal current of the semiconductor 12 as a function of the number of photons received from the incident electromagnetic radiation which penetrates the surface of the semiconductor slab 10. There is first a sharp increase followed by a leveling off of photoconductive signal current as the wave length of the incoming radiation increases. The solid curve B is characteristic of semiconductors having a moderately large surface recombination velocity for electromagnetic radiation of appropriate wavelength and intensity, and the dashed curve A of FIG. 2a indicates the response to incident electromagnetic radiation of predetermined wavelength and intensity when the surface recombination velocity is low. The material used in the present device has a characteristic curve indicated as B in FIG. 2a, and the operational energy range of the incoming electromagnetic radiation which is dependent upon wavelength will fall somewhere in the region indicated on FIG. 2a. The photoconductive signal in semiconductor 12 is inversely proportional to the surface recombination velocity of charge carriers and by applying suitably large fields at the external electrodes 13 and 22 from source 14, the surface recombination velocity of charge carriers can be swung from point B to point A as illustrated in FIG. 2b. This is accomplished by varying the surface potential of semiconductor slab 12 in the positive and negative directions relative to point O of FIG. 2b thereby causing a bending of the energy bands at the surface of the semiconductor 12. As the energy bands at the surface of the semiconductor 12 are varied, the rate of formation of hole-electron pairs 15 is determined by the surface recombination velocity of charge carriers therein. In the present device, it is the sensitivity of the semiconductor that is modulated rather than the intensity of the electromagnetic radiation incident thereon. The change in the surface charge recombination velocity (SRV) which induces an equivalent change in the photoconductive signal in semiconductor 12 has its speed limited only by the speed of recombination of the hole-electron pairs at the surface of the semiconductor. The SRV will be modulated by a frequency $f_1$ of source 14 and the sensitivity of semiconductor 12 will also vary as $f_1$. There will be a signal at $f_1 \pm f_2$ supplied to the wave analyzer 18 due to the field effect induced charge supplied by source $f_2$ to the photoconductive slab 12.

As previously stated, the advantages of this novel circuit include high speed sampling and low power consumption, and the weight of the radiation chopper per se is negligible. The power necessary to operate this circuit is merely that needed to charge up the capacitor comprising semiconductor slabs 10 and 12 and dielectric 11, i.e., $CV^2/2$, where V is the voltage impressed across the slabs and the capacity C is measured in farads. Since voltages of the order of 100 volts are needed at source 14 to swing the surface potential $\psi$ about point O from point A to point B as shown in FIG. 2b, the capacitor is of the order of 100 picofarads and the power consumed will lie in the microwatt range. It should be noted here that the variation of surface potential $\psi$ about point O has been selected for a range of maximum percentage of modulation of the SRV, and the sampling speed of the chopper is a function of the above percentage.

Successful operation of the present invention has been carried out using silicon for semiconductor 10 and silicon ($S_i$), germanium (Ge) and indium antimonide (InSb) semiconductors for slab 12.

Obviously, many modifications and variations of the present invention are possible in the light of the above teachings. In particular, instead of a photoconductive slab for semiconductor 12, a photovoltaic diode may be used yielding the same type of modulation of the output voltage as would be observed in the photoconductive mode. In the photovoltaic mode of operation, the junction would be parallel to the surface exposed to the electromagnetic radiation and the modulating plate, semiconductor 10. In addition to the silicon, germanium and indium antimonide semiconductors employed as slab 12, all other members of the III–V and II–VI groups of semiconductors work equally as well. Indium antimonide and gallium arsenide (GaAs) are examples of the III–V group of semiconductors and zinc sulfide (ZnS) and cadmium telluride (CdTe) are examples of the II–VI group of semiconductors. The III–V and II–VI notation represents compounds consisting of atoms in the group III and group V and the group II and group VI, respectively, of the standard periodic chart of the atoms. It is therefore to be understood that within the scope of the appended claims the invention may be practiced otherwise than is specifically described.

What is claimed as new and desired to be secured by Letters Patent of the United States is:

1. A photodector device for sampling electromagnetic radiation comprising:
   capacitor means having a semiconductor material forming one plate thereof;
   a second plate comprising material transparent to a predetermined bandwidth of electromagnetic radiation to be detected;
   dielectric material disposed between said plates;
   output circuit means connected to said semiconductor material for conducting a photo signal current having a value dependent upon the properties of said semiconductor material;
   said semiconductor having a first value of the signal output dependent upon the photon energy received from incoming electromagnetic radiation and
   electric field means connected to said capacitor means for modulating the surface potential of said semiconductor whereby the surface recombination rate of said semiconductor is varied in accordance with said modulation to vary said signal value about said first value.

2. The combination of claim 1 wherein said capacitor means comprises a second plate consisting of material transparent to the wavelength of radiation to be detected;
   said electric field means being connected across said plates.

3. The combination of claim 2 wherein said second plate is a photoconductor selected from the group consisting of elemental semiconductors germanium and silicon and the group III–V and group II–VI classes of semiconductors.

4. The combination of claim 2 wherein said second plate is a photovoltaic device selected from the group consisting of elemental semiconductors germanium and silicon and the group III–V and group II–VI classes of semiconductors.

5. A photodetector device for sampling infrared, visible and ultraviolet radiation comprising:
   capacitor means having a semiconductor forming one plate thereof for receiving said radiation;
   electric field means coupled to said capacitor means for modulating the surface recombination rate of said semiconductor and
   output circuit means connected to said semiconductor for conducting a photo signal having a first component dependent upon photon energy received from said radiation which is modulated in accordance with said surface recombination rate.

6. A device for sampling electromagnetic radiation comprising
   first, and second semiconductor means forming the plates of a capacitor and having a dielectric material therebetween;
   a first source of electric potential connected across said first and second semiconductor means;
   a second source of varying electric potential directly connected across the primary winding of a transformer;
   said transformer having a center secondary winding with its center tap grounded and connected in a series circuit including said second semiconductor;
   said second semiconductor being responsive to photon energy received from electromagnetic radiation incident thereon to pass a photo signal proportional to the recombination velocity of charge carriers at the surface thereof;
   means for modulating the electric potential of said first voltage source to vary said recombination velocity and modulate said photo signal;
   and output means connected to receive the modulated photo signal.

7. The combination of claim 6 wherein said output circuit comprises wave analyzer means for receiving said photoconductive signal at the sum and difference frequencies of said first and second sources.

8. The combination of claim 6 wherein said series circuit comprises two electrodes spaced apart on a slab forming said second semiconductor, a variable resistor interconnecting one end of said secondary transformer winding to one of said electrodes and the other end of said secondary winding connected to the other of said electrodes.

9. The combination of claim 8 including a wave analyzer connected to said variable resistor for receiving said photo signal at the sum and difference freqencies of said first and second sources.

10. The combination of claim 9 wherein said first semiconductor consists of a silicon slab and said second semiconductor comprises a photoconductor selected from the group consisting of germanium, indium antimonide, silicon, gallium arsenide, zinc sulfide, and cadmium telluride.

References Cited by the Examiner
UNITED STATES PATENTS

| | | | |
|---|---|---|---|
| 2,978,652 | 4/1961 | Thomas | 250—211 X |
| 3,102,959 | 9/1963 | Diemer | 307—88.5 |

RALPH G. NILSON, *Primary Examiner.*

J. D. WALL, *Assistant Examiner.*